INVENTORS
OTHO K. McFARLAND
GEORGE M. ILLICH &
BY   WILFRED C. LING

Bair, Freeman & Molinare

ATTORNEYS

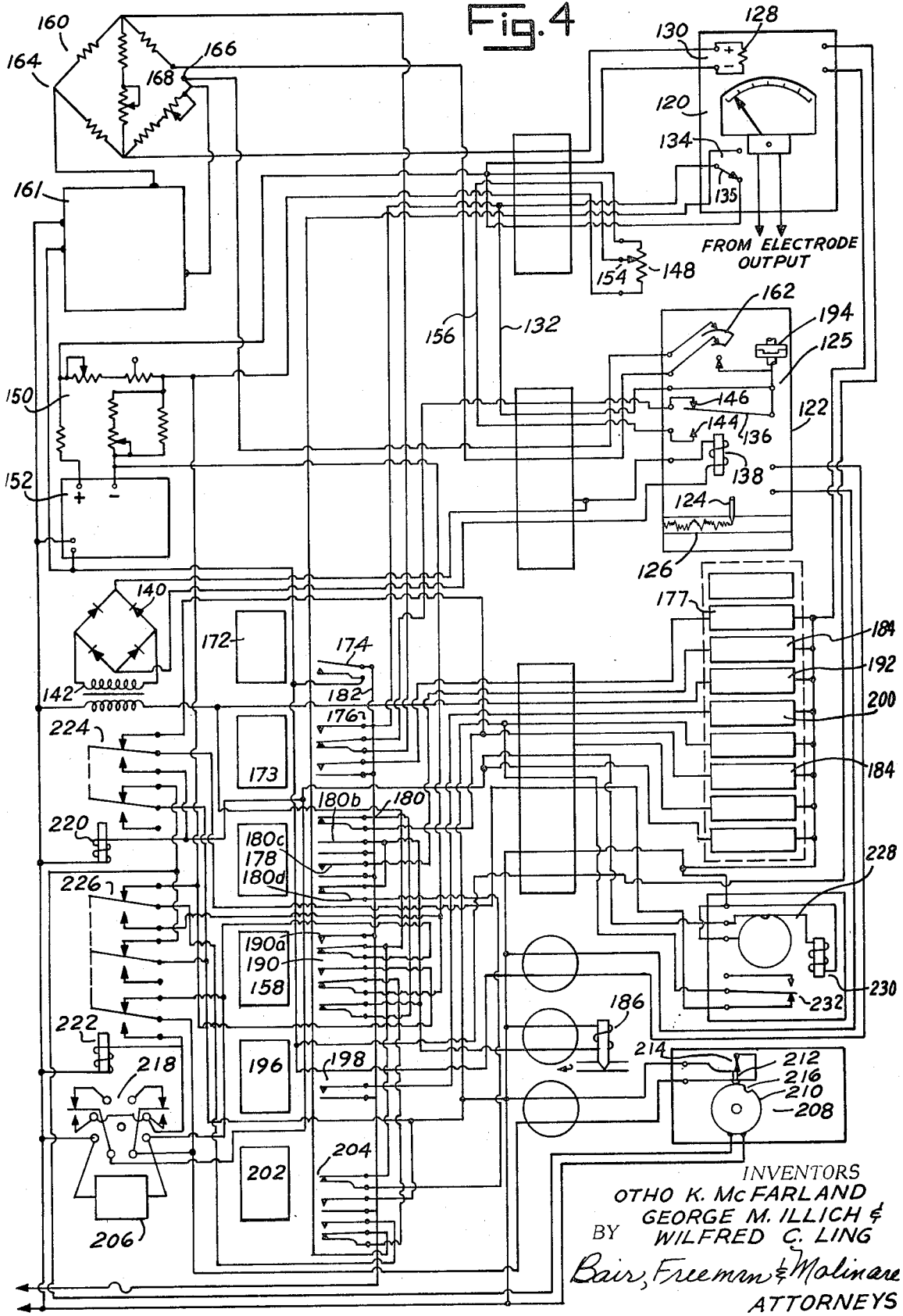

United States Patent Office 3,689,222
Patented Sept. 5, 1972

3,689,222
CARBON DIOXIDE MONITOR
Otho K. McFarland, Glencoe, George M. Illich, Jr., Lake Forest, and Wilfred C. Ling, Lake Bluff, Ill., assignors to Abbott Laboratories
Filed Sept. 24, 1969, Ser. No. 860,756
Int. Cl. B01k 3/00; G01n 33/16
U.S. Cl. 23—230 R         14 Claims

ABSTRACT OF THE DISCLOSURE

A monitor for continuously measuring the partial pressure of $CO_2$ in a stream of intravenous liquid includes an ion sensitive electrode having a bicarbonate buffer solution. The electrode is positioned in a sampling cavity which is maintained continuously full of the intravenous liquid which is to be monitored and the buffer solution is separated from the cavity by a semipermeable Teflon membrane. A sampling stream of the liquid is directed into the body of liquid in the cavity and against the membrane and at least a portion of the $CO_2$ in the stream passes through the membrane to vary the pH of the buffer solution as a function of the partial pressure of the $CO_2$ in the sample stream. The change in pH is measured to provide an indication of the partial pressure in the sample. Calibration of the monitor is effected by draining the chamber and exposing the membrane to a nebulized gaseous mixture of the liquid and a standard $CO_2$ of a known partial pressure.

BACKGROUND OF THE INVENTION

This invention relates to a monitor for continuously determining the partial pressure of a gas in a liquid solution and, more pahticularly, to a method and apparatus for continuously monitoring the partial pressure of carbon dioxide in a stream of intravenous liquid.

During the manufacture and bottling of various intravenous solutoins, and in particular, nourishing solutions such as amino acids and starch solutions, an inert gas is usually introduced into the batch of intravenous liquid prior to containerizing for the purpose of providing an inert atmosphere in the finally containerized product. Such inert environment or atmosphere is generally necessitated to prevent undesirable oxidation and spoilage of the intravenous nutrients during shelf storage. Carbon dioxide is one such inert gas which is frequently employed. The gaseous carbon dioxide is usually introduced into the mass volume of intravenous liquid in the tank or the like whch holds the liquid just prior to the bottling step. After the liquid has been transferred from the tank and introduced into containers and sealed, a certain portion of the carbon dioxide diffuses from the liquid into the upper space above the liquid in the container to maintain a specified partial pressure of carbon dioxide at equilibrium above the liquid, minimizing the possibility of air oxidation of the liquid contents of the container. If the amount of carbon dioxide in the liquid just prior to its containerization is undesirably low, the requisite partal pressure above the liquid in the container may be reduced to the point where undesirable oxidation of the liquid nutrient occurs.

The methods and apparatus employed in the past, at best, monitor a batch of containerized intravenous liquid by a random sampling method which is both time consuming, cumbersome and results in the possibility of certain containers having a defective inert gas pressure reaching the consumer. In such prior monitoring techniques, one or a few of the filled containers are removed from a given batch and a predetermined given volume of carbon dioxide gas is injected into the container in the space above the liquid. Sufficient time is allowed for equilibrium to occur and the partial pressure of the carbon dioxide in the space is then measured to determine the amount of carbon dioxide which has gone into solution. If a sufficient amount of carbon dioxide was originally present in the solution, a correspondingly lesser amount of the injected gas will enter into solution. Conversely, if the amount of carbon dioxide in the solution was deficient, a correspondingly greater amount of the injected gas will pass into solution. Thus the quality of a given container is determined and that quality is extrapolated statistically to the entire batch of filled containers.

Clearly such method of determining the sufficiency of the inert gas environment of a batch of intravenous liquid is both time consuming and cumbersome. Moreover, the possibility is always present that defective containers which were not included in the random sample might reach the consumer. Alternatively, if a particular one of the containers which is sampled, is itself defective and the remaining containers in the batch are not defective, the entire batch may be discarded based on the sample resulting in a waste of manufactured product.

The apparatus and method of our invention obviates these numerous disadvantages and is capable of continuously monitoring the partial pressure of a gas in a liquid stream. The monitor of our invention continuously monitors a continuous stream of intravenous liquid and an ion sensitive electrode produces electronic output signals which correspond to the partial pressure of carbon dioxide present in the stream. The apparatus and method of our invention are both extremely sensitive to slight variations in the partial pressure of the gas and are capable of continuously monitoring the flowing stream of the liquid prior to containerization, thus obviating the possibility of a defective product reaching the consumer, and waste of product. The monitor of our invention substantially reduces the possibility of drift which, in turn, substantially reduces the necessity of frequent off-line recalibration of the monitor. The monitor constructed in accordance with the principles of our invention also substantially reduces the possibility of erroneous readings due to the presence of air bubbles and the like in the liquid being sampled. Finally, a simple and effective recalibration arrangement is provided in accordance with the principles of our invention which may be employed to periodically recalibrate the monitor to avoid erroneous indications.

SUMMARY OF THE INVENTION

In one principal aspect, a monitor is provided which continuously measures the partial pressure of a gas in a liquid solution and includes a housing having a chamber therein and an ion sensitive electrode positioned in the housing. The electrode contains a buffer soluton and a semipermeable membrane separates the buffer solution from the chamber. An impinger introduces a sample stream of the liquid containing the gas into the chamber and aganst the membrane so that at least a portion of the gas passes through the membrane to alter the pH of the buffer solution by an amount corresponding to the partial pressure of the gas. Means is provided on the electrode for measuring the change in pH of the solution to produce an output indicative of the partial pressure of the gas and a discharge is provided for removing liquid from the chamber, the discharge and the impinger being positioned so as to maintain the chamber adjacent the membrane continuously and completely full of the liquid.

In another principal aspect, a method for continuously monitoring a stream of liquid to determine the partial pressure of a gas therein includes maintaining a membrane permeable to the gas in continuous contact with a flow of the liquid by continuously impinging a stream of the liquid on one side of the membrane and continuously altering the pH of a buffer solution on the other side of the membrane as a function of the partial pressure of the gas by continuously diffusing at least some of the gas through the membrane. The magnitude of the pH change in the buffer solution is sensed with an ion sensitive electrode to generate a signal indicative of the partial pressure of the gas.

In still another principal aspect, a method is provided for continuously monitoring the partial pressure of carbon dioxide in an intravenous solution and includes continuously impinging a sample flow of the intravenous solution against one side of the membrane, altering the pH of a bicarbonate solution on the other side of the membrane as a function of the partial pressure of the carbon dioxide in the sample flow by the diffusing carbon dioxide through the membrane, and sensing the magnitude of the pH change in the bicarbonate solution with an ion sensitive electrode to produce a signal which is indicative of the partial pressure of the carbon dioxide in the solution.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 4 is a circuit diagram showing a preferred electronic circuit for continuously reading out and recalibrating the assembly shown in FIG. 1.

DESCRIPTION OF THE PREFERRED EMBODIMENT

The sampling assembly

Figure 1:
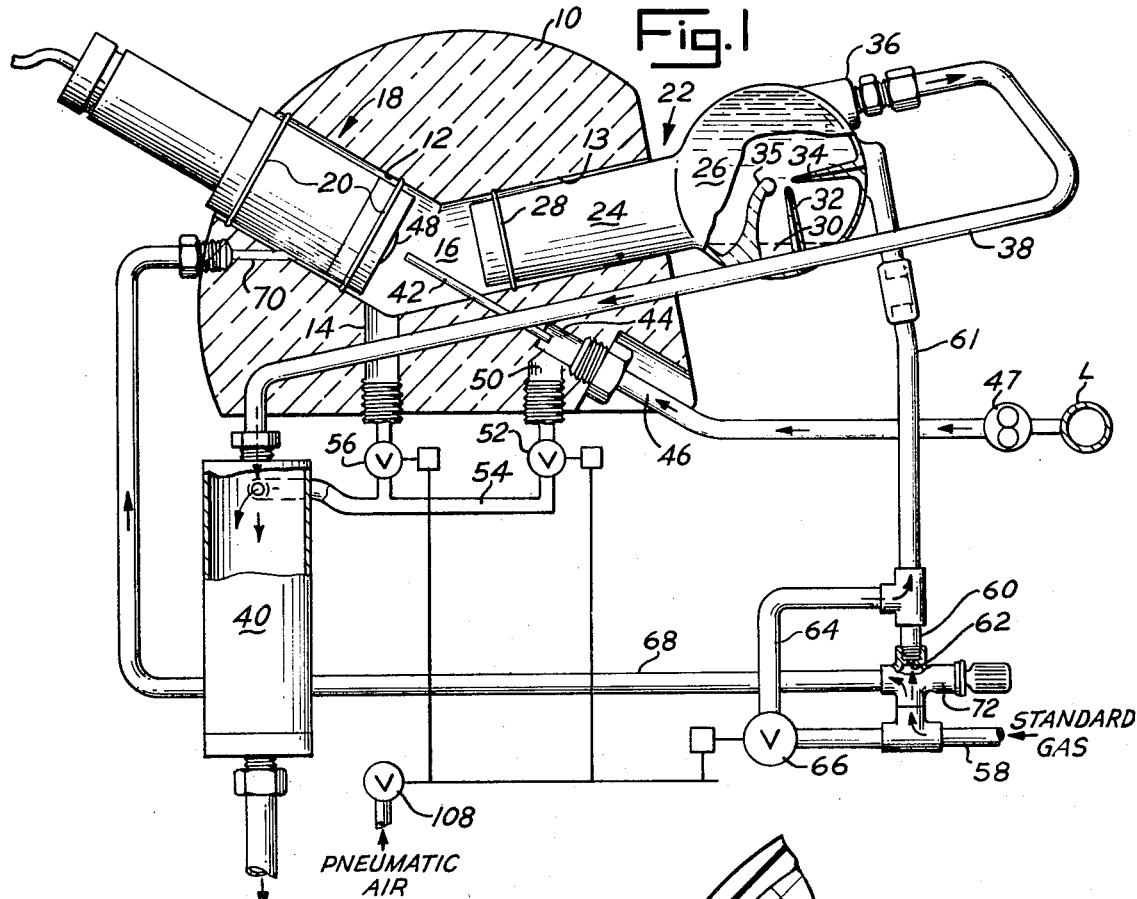
FIG. 1 is an elevation partially cross-sectioned view of a preferred embodiment of gas partial pressure sampling assembly constructed in accordance with the principles of our invention.

In FIG. 1, a preferred embodiment of the overall sampling assembly is shown which includes a housing block 10, formed of a suitable transparent material such as lucite. The block 10 has a plurality of major bores 12, 13 and 14 formed therein which extend from the exterior of the block and meet at one end to form a sampling chamber or cavity 16. An ion sensitive pH electrode, generally 18, is positioned in bore 12 and provided with suitable O-rings 20 to prevent leakage past the electrode from the cavity 16 to the exterior of the block. The specific details, principles of operation and modifications of the electrode will be outlined in more detail later.

Positioned in bore 13 is a nebulizer, generally 22, for calibrating the electrode periodically during operation. The nebulizer 22 includes a tubular neck 24 which communicates with a chamber 26 and an O-ring 28 is provided about the sampling cavity end of the neck 24 to prevent leakage from the cavity 16 between the neck and the bore 13. The neck communicates with and terminates in the enlarged bulbous nebulizing chamber 26, a portion of the chamber being positioned beneath the neck so as to provide a sump 30 for holding a portion of liquid when the cavity 16 is drained. A liquid aspiration conduit 32 communicates at one end with the sump 30 and the other discharge end is positioned adjacent the discharge end of a gas inlet conduit 34 which is connected to a supply of standard carbon dioxide gas.

A spray diffuser 35 is also positioned adjacent the discharge ends of conduits 32 and 34 to assist in forming a uniform vapor atmosphere during the calibration operation which will be described in more detail later. Positioned in the upper portion of the chamber 26 is an overflow discharge outlet 36 which communicates with a drain conduit 38 connected at the other end to a waste manifold 40. The discharge outlet 36 is positioned at the top of the chamber so as to maintain the sample cavity 16, tubular neck 24 and a major portion of the nebulizer chamber 26 continuously full of the liquid being sampled during the monitoring operation.

A small bore impinger 42 is positioned in a bore 44 of block 10 and communicates at one end with a sample inlet conduit 46 which is connected to a production flow line or the like L and a suitable continuously operating constant delivery peristaltic pump 47 continually diverts and delivers a small continuous portion of the flow from flow line L to the impinger for injection into the cavity 16. The other end of the impinger 42 is positioned closely adjacent a membrane 48 which covers the end of the electrode 18 such that the fluid stream issuing from the end of the impinger 42 gently play upon the membrane.

A bypass bore 50 is provided in the housing for diverting the sample inlet stream from the impinger 42 to the waste manifold 40 through a drain conduit 54 and a bypass valve 52, which is preferably pneumatically actuated.

A drain valve 56, which is also pneumatically actuated, is also provided which communicates with bore 14 for draining the cavity 16 through the drain conduit 54 to manifold 40.

A carbon dioxide standard gas piping arrangement is provided which includes a main conduit 58 which is adapted to be connected to a source of standard carbon dioxide gas at a given pressure. A branch conduit 60 connects the main 58 with the gas inlet conduit 34 to the nebulizer 22 through gas line 61. A small orifice 62 is provided in the branch 60 to maintain a small flow of standard gas to the nebulizer at all times during the monitoring cycle. Such flow maintains the liquid which substantially fills the nebulizer chamber 26 in a slightly agitated state and prevents clogging of the relatively small discharge apertures in the ends of conduits 32 and 34 and the accumulation of stale liquid in sump 30. A second branch conduit 54 extends from the main 58 through a pneumatically actuated valve 66 and is connected to the gas line 61 in bypassing relationship to the orifice 62 for introducing the standard carbon dioxide at an increased flow rate to the nebulizer during the calibration stage which will be described in more detail later. A third conduit 68 extends from the main 58 to a relatively small injection bore 70 for feeding the standard carbon dioxide gas to the electrode 18, the construction and purpose of which will be described in more detail later. The flow through conduit 68 is metered by a metering valve 72.

The electrode

Figure 2:
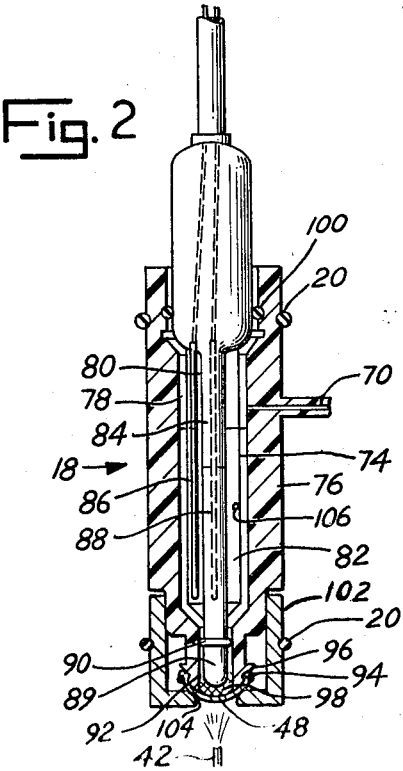
FIG. 2 is an enlarged partially cross-sectioned view of the sensing electrode of our invention.
Figure 3:
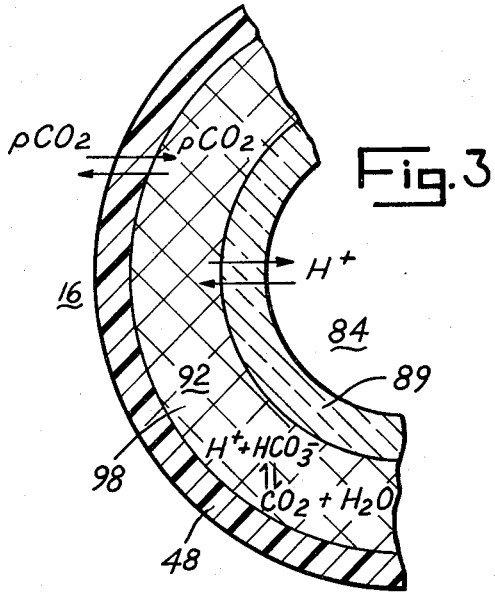
FIG. 3 is a schematic presentation of operation of the sensing electrode of our invention.

Referring to FIGS. 2 and 3, the electrode 18 is a pH glass electrode which is constructed to signal the pH of a thin film of aqueous sodium bicarbonate buffer solution. The electrode includes a generally cylindrical elongated tubular glass element 74 which is surrounded by a tubular concentric jacket 76 which is formed of stainless steel or other suitable strong material and which forms a housing for the electrode. The inner diameter of the jacket 76 is somewhat greater than the diameter of the glass element 74 so as to provide an annular recess 78 which acts as a reservoir of sodium bicarbonate buffer solution. Still another elongated tubular cylindrical glass element 80 is concentrically positioned within element 74 and is sealed therefrom, the space between the outer wall of element 80 and the inner wall of element 74 forming a first annular reference electrode chamber 82 and the interior of element 80 defines a second sensing electrode chamber 84. Each of the chambers 82 and 84 is filled with a KCl electrolyte solution of approximately 0.1 M, and a mercury amalgam reference electrode 86, such as a calomel electrode, is positioned in the electrolyte in chamber 82 and a calomel sensing electrode 88 is positioned in the electrolyte in the sensing chamber 84.

The end of element 80 extends beyond element 74 at 89 and an O-ring 90 is positioned about the extended end to form an operating chamber 92 at the extended end 89 and separates the chamber 92 from the buffer solution reservoir 78. The open end of the jacket 76 is covered with the membrane 48, the membrane being permeable to the gas which is to be measured, in this instance carbon dioxide. The membrane is preferably formed of a thin Teflon film which allows the passage of carbon dioxide, but which prevents the passage of any other molecules which might adversely alter the pH of the buffer solution. The membrane 48 is sealingly secured by a suitable means to the end of the jacket 76, such as by an elastic band 94 which cooperates with an annular notch 96 in the end of the jacket. A thin layer of nylon mesh or grid 98 is packed between the membrane 48 and the tip of the extended glass sensing element 89 and the mesh is saturated wih the sodium bicarbonate buffer solution. The O-ring 90 substantially seals the operating chamber 92 from the bicarbonate buffer reservoir 78, but allows a slight transfer of the buffer solution back and forth to maintain the buffer in the operating chamber in a replenished and steady state.

An O-ring 100 is provided at the other enlarged end of glass element 74 to prevent leakage from the reservoir 78 to the exterior of the electrode. A cap member 102 is fitted over the end of the jacket and the membrane 48 is exposed through an aperture 104 in the cap.

The electrode thus far described in basically a Severinghaus $CO_2$ cell which is obtainable from Instrumentation Laboratories, Boston, Mass. Severinghaus electrodes have been used in the past primarily for batch pH measurements and are generally unacceptable as such for the continuous on-line monitor which is contemplated by our invention, due to rapid and excessive drift. Such drift apparently results from a migration of bicarbonate ions between the operating chamber 92 and the reservoir 78, and since the diffusion rate past the O-ring 90 never reaches the steady state, a long-term drift in electrode potential results. It has been found that this drift in the Severinghaus electrode can be prevented by continuously bleeding a small amount of gas of a fixed carbon dioxide content into the reservoir 78. The presence of the gas in the reservoir tends to stabilize the carbon dioxide partial pressure in the buffer solution and maintains a steady state diffusion between the operating chamber 92 of the electrode and reservoir. The bleed rate may be adjusted by the metering valve 72.

Description of operation of the sampling assembly during monitoring

At the commencement of monitoring of the intravenous solution bypass valve 52, drain valve 56, and nebulizer gas valve 66 are closed and a small portion of the production liquid intravenous stream is continuously diverted from the production flow line L by pump 47 and passes through the sample inlet conduit 46, through bore 44 and through the impinger 42, discharging against the sampling cavity side of the Teflon membrane 48 of the electrode 18. The carbon dioxide, the partial pressure of which is to be measured, has been previoulsy mixed into the intravenous liquid passing through line L. Therefore, the sample portion which is diverted from line L and passed to the sampling cavity is of substantially the same gas content as the main stream.

Since the drain valve 56 is closed, the sample flowing through the impinger 42 will collect in cavity 16 and fill the sampling cavity and the neck 24 and a major portion of the chamber 26 of the nebulizer, the level in the chamber 26 being fixed by overflowing at outlet 36 and passing through drain conduit 38 to waste manifold 40.

When the cavity 16 is full, the membrane 48 is completely contacted by the body of liquid in the cavity and the impinger directs its stream into the body of liquid, the liquid leaving the impinger in a direction substantially normal to the membrane. In actuality, the stream flowing from the impinger 42 does not actually impact the membrane 48 as such, but is injected into the body of liquid in such a manner that the stream reaches the membrane in a substantially non-pressurized state and continuously supplies the membrane with fresh sample liquid at all times displacing away from the membrane 48 the fluid which has just previously been monitored. The discharge rate of the impinger 42 and the distance between the impinger tip and the membrane should be adjusted such that the stream issuing from the tip of the impinger into the body of liquid just falls short of pressurized impact on a membrane since increased impact pressure on the membrane will result in increased diffusion of carbon dioxide across the membrane and provide erroneous partial pressure readings as will become evident when considering the description of the electrode operation which will be described in more detail later. The flow rate and impinger-to-membrane distance may be readily determined by one of ordinary skill in the art when he considers the requirement of avoiding pressurized impact. Since the impinger 42 continuously supplies the membrane 48 with fresh sample intravenous solution and sweeps away liquid from the surface of the membrane which has already been analyzed, and since the cavity 16 is maintained completely filled at all times during the measuring operation, the likelihood of erroneous readings due to the presence of gas bubbles and stale liquid is substantially reduced, if not eliminated altogether, such being a necessity in the continuous monitoring operation contemplated.

Referring particularly to FIGS. 2 and 3, as the introvenous liquid with the inert carbon dioxide gas suspended therein contacts the Teflon membrane 48, a certain amount of the carbon dioxide diffuses through the membrane either from or to the operating chamber 92 and the sodium bicarbonate buffer solution contained therein. The amount of carbon dioxide which diffuses through the membrane will depend upon the bicarbonate ion concentration in the buffer solution and the amount, and hence the partial pressure, of carbon dioxide which is carried by the intravenous solution. For a given buffer concentration if the partial pressure of the carbon dioxide is relatively high, carbon dioxide will tend to diffuse through the membrane from the cavity 16 to the buffer solution. Such addition of carbon dioxide will drive the ion equilibrium equation in one diretcion such that the $H^+$ ion concentration in the sensing chamber will increase. Since the tip of the glass element 89 is permeable to $H^+$ ions, the increase in $H^+$ ion concentration will tend to cause $H^+$ ions to diffuse from the solution in chamber 92 to the electrolyte in the sensing electrode chamber 84 to change the potential of the cell in the manner comparable to a conventional standard pH electrode. On the other hand, if the partial pressure of the carbon dioxide in the cavity is low, carbon dioxide will tend to diffuse through the membrane from the buffer solution to the cavity 16 driving the equilibrium equation in the opposite direction, reducing the $H^+$ ion concentration in the buffer solution and effecting a diffusion of $H^+$ ions from the electrolyte to the buffer solution.

The nylon mesh 98 tends to maintain the buffer solution in continuous contact with both the tip 89 of the extended end of the glass electrode and the Teflon membrane 48 and allows steady state equilibrium to be attained more rapidly. The mesh is maintained in a saturated condition by the reservoir 78 of bicarbonate solution and acts as a salt junction between the measuring tip 89 and the reference electrode 86 via a tiny aperture 106 in element 74 which communicates between reservoir 78 and the reference electrode chamber 82.

The buffer solution is preferably selected to be of a concentration such that the electrical output of the electrode is approximately 56 millivolts for each ten-fold change in the partial pressure of the carbon dioxide. A suitable buffer solution may be obtained from Instrumentation Laboratory, Inc., Boston, Mass. as their solution No. 106–22. When such solution is used, the pH of the buffer solution has been found to fall about 1 pH unit for each ten-fold increase in $pCO_2$, thus providing a pH variation which is a linear function of the logarithm of $pCO_2$.

During the measuring cycle of the monitor, a standard carbon dioxide gas is continuously fed through metering valve 72 to reservoir 78 and also fed through the orifice 62 to the gas inlet conduit 34 of the nebulizer 22 for the reasons previously described. The flow to the reservoir 78 is only slight and is just enough to maintain the buffer saturated without pressurizing the reservoir to any appreciable extent. The flow through the tip of the inlet 34 is also small and no atomization of fluid occurs since the nebulizer chamber 26 is maintained substantially filled at all times during the monitoring operation.

Description of operation of the sampling assembly during calibration

Although the bleed of carbon dioxide into reservoir 78 substantially reduces drift in the electrode, some drift will occur over an extended time. For this reason the readout circuit should be periodically recalibrated to prevent erroneous readings caused by long term drift. A suitable control valve 108 is opened periodically to introduce working air to valves 52, 56 and 66 to open the valves simultaneously. Opening of valve 108 may be automatically controlled by a timer if desired. When drain valve 56 is opened, the liquid which fills the cavity 16 and the nebulizer chamber 26 is drained to the drain conduit 54 and into waste manifold 40, with the exception of a small portion of the liquid remaining in the sump 30 in nebulizer chamber, the level being shown by the dotted line in FIG. 1. The opening of the bypass valve 52 diverts the sample stream from the impinger 42 to the drain conduit 54 and the waste manifold and the sample stream thereby ceases to issue into the cavity 16 from the impinger. When valve 66 is opened, the standard carbon dioxide gas bypasses the orifice 62 and is introduced directly into gas line 61 and flows to the nebulizer inlet conduit 34. The increased flow of gas across the tip of the liquid aspirator 32 reduces the pressure at the tip drawing liquid from the sump 30 and atomizing the liquid to produce a mixture of standard carbon dioxide and liquid in the form of a gas equilibrated cloud. The cloud fills the nebulizer chamber 26, and the cavity 16 and is "seen" by the membrane 48, a selected portion of the carbon dioxide gas in the cloud diffusing through the membrane to produce an electrode signal in a manner similar to that previously described. This signal may be readily compared with what the output signal should be for the given standard gas partial pressure and the signal may be compensated for accordingly as necessary.

The standard gas mixture should preferably have a $pCO_2$ exceeding that of the intravenous solution which is to be monitored for optimum response, since the solution drawn from the sump will tend to contribute somewhat to the partial pressure of the cloud which is seen by the membrane and a long equilibration time will be required for calibration. It has been found that a flow rate of standard carbon dioxide from the gas inlet 34 of approximately 1500 cc./min. is sufficient to produce the gas cloud desired while avoiding excessive use of the standard gas mixture and any cooling effect which might be brought about due to the expansion of the gas. A one hundred percent carbon dioxide standard gas is preferred at 21° C. and 14.7 p.s.i.a. to insure adequate aspiration of all intravenous solutions.

Although the liquid used in the formation of the calibration cloud has been described as being the intravenous liquid which has been left in the sump, water may also be nebulized for long continuous calibration periods without a falloff in the partial pressure of water as might be experienced due to evaporation after a substantially lengthy calibration step with a salt solution or a heavy loaded intravenous solution. The use of water is not generally necessary however, since with the apparatus and method described, only a few minutes will usually be required in most circumstances to reach equilibrium during calibration.

Electronic circuitry

According to the principles of applicant's invention the partial pressure of the $CO_2$ may be monitored by a meter 120 and a recorder 122. As has been explained, the electrode 18 generates a voltage representative of the partial pressure of a gas. The meter 120 is a common volt meter of the type well known in the art, such as a Leads and Northrup Model 7407 having a full scale reading at 200 millivolts representing a two decade change from the sensing electrode. This meter 120 is capable of recording changes from 10 to 1,000 mm. Hg $pCO_2$.

The recorder 122 is of the type commonly known in the art, having a stylus recording pen 124 responsive to the voltage impressed on the input 125 of the recorder. The recording sheet 126 on which the pen 124 records may be driven by a two speed motor (not shown). The recorder selected for this particular embodiment was one of the type known as a Leads and Northrup Speedomax W recorder having a 100 millivolt full scale input sensitivity. Because of the sensitivity differences between the meter and the recorder, a 200 ohm precision resistor 128 was connected in parallel with the recorder output terminals 130. The output of the meter is delivered to the recorder through conductor 132 by a single pole double throw rotary switch 134 for changing the recorder scale from 10–100 mm. Hg $pCO_2$ to 100–1,000 mm. Hg $pCO_2$. This single pole double throw rotary switch 134 allows the meter to read its normal two decade scale and provides a manually operable method by which the recorder may register either of the two expanded scale by merely alternating the switch 134. The recorder is provided with a recorder input switch 136 which may be activated by a recorder solenoid 138 for alternating the input to the recorder 122. The recorder solenoid 138 is energized by power delivered through a diode bridge 140 from a 110 volt to 24 volt transformer 142. Thus, whenever power is delivered to the transformer 142, the solenoid 138 is energized and the recorder input switch 136 is depressed to make contact with immobile terminal 144. When no power is supplied to the transformer 142, the switch returns to its normal position in contact with upper immovable terminal 146.

As has been previously mentioned, there is inherent error in a reading taken directly from the electrode 18. Thus a method of automatically calibrating the recorder has been devised according to the principles of the invention. To provide a predetermined voltage for the calibration of the recorder, a ten turn 100 ohm micrometer 148 has been placed in parallel with the output resistive network 150 of a DC power supply 152 of the type commonly known in the art. The power supply may take the forms of a Leads and Northrup Regulated Power Supply Part No. 099012 having a rating of 1.050 volts at 10 milliamps for a fixed resistive load of 105 ohms. The 100 ohm micrometer 148 has a manually adjustable microdial 154 for dividing the fixed voltage across the micrometer 148 and delivering a portion of the voltage through conductor 156 to the lower immovable terminal 144 of the recorder input switch 136. Thus whenever the recorder solenoid 138 is activated, the single pull double throw switch 134 is in contact with the lower moveable terminal 144 and a predetermined voltage set by the microdial 154 is impressed across the recorder input 125. As will be further explained, the depression of the calibrate button 158 supplies power to the transformer 142 which actuates solenoid 138 and causes the predetermined voltage to be impressed across the recorder input 125.

A compensating voltage in series with the meter output from the moveable arm 135 of the switch 134 may be produced by a resistive bridge network 160 having power supplied to it by a solid state DC power supply 161 of the type commonly known in the art. The resistive bridge may be of the type commonly called a Wheatstone bridge having an adjustable restandardizing slide wire resistor 162 in series connection in one arm of the bridge. The DC power supply should be connected to the two terminals 164 and 166 not connected across the bridge arms 168.

The bridge arm 168 is series connected to the output of the meter 120. Thus the voltage across the bridge arm 168 causes a change in the voltage across the record input 125 when the recorder input switch 136 is connected to the output of meter 120.

Description of operation of the electronic metering and recording system

For the operation of the system, a recorder panel 170 is provided having control buttons with associated control lamps. Thus when the off button 172 is depressed, switch 174 is open and no power is served to any component in the system. The power which may be served to the basic components is of the type commonly obtainable from a standard household outlet having 110 volt 60 cycle per second current.

When the standby button is depressed switch 174 closes and double pole double throw standby switch 176 is moved into contact with upper immovable contacts of the switch 176. The alteration of these switches causes power to be served to the recorder 122 and the meter 120 with the recorder input shorted out through the upper moveable contact of the double pole double throw switch 176, thus holding the recorder pen 124 at the zero position. The recording sheet 126 may be set in motion through independent control of the recorder sheet motor (not shown). The standby switch 176 also activates the standby light 177 through lower moveable contact of switch 176.

Depression of the standard button 178 causes the standby switch 176 to return to its normal position in contact with lower immovable member of the contact switch. It also causes the four moveable contact members of the standard switch 180 to move out of their normal position and into contact with the upper immovable contact members of the standard switch 180. Thus power may be served from power line 182 through immovable contact 180c to standard light 184 and through immovable contact 180b to a control valve solenoid 186. When the control valve solenoid 186 is energized, the control valve 108, is opened and, as has been described, working air is introduced to valves 52, 56 and 66 which cause the substitution of the sample liquid solution having a gas the partial pressure of which is to be determined for a standardized gas the partial pressure of which is known. Thus, with the standard button 178 depressed, a standard gas is introduced to the electrode 18 and the recorder input 125, no longer shorted by standby switch 176, receives the meter output representative of the voltage generated by the electrode 18. In this mode the recorder 122 and meter 120 may be observed to follow a change in reading over a period of time ultimately reaching an equilibrium position.

Having reached the equilibrium position the calibrate button 158 may be depressed. Depression of calibrate button 158 causes the moveable contact members of standard switch 180 to return to normal position in contact with lower immovable contact members. The depression of the calibrate button 158 also causes the moveable members of double throw calibrate switch 190 to be moved into contact with upper immovable contact members of the calibrate switch 190. In the calibrate mode the control valve solenoid 186 remains energized through standard switch immovable contact member 180d and through immovable contact member 190a of calibrate switch 190. Also the transformer 142 is energized by connection to power line 182 through upper immovable member 190a of calibrate switch 190. The energizing of the transformer 142 also serves power to calibrate light 192 and activates the recorder solenoid 138 through the diode bridge 140.

Thus the voltage impressed across the recorder input is a predetermined voltage from the 100 ohm micrometer 148 set by the adjustment of the microdial 154.

In practice this predetermined voltage is mathematically respective of the partial pressure of the gas in the standard solution introduced to the electrode for calibration. The partial pressure of the standard gas is easily determinable because the analyzed percentage of the gas in the standard solution used is known. Thus for example where the gas introduced is 100% $CO_2$ at 744 mm. Hg atmospheric pressure in contact with water at room temperature, the gas would have a partial pressure of 720 mm. Hg where the water vapor at 25° C. would have a partial pressure of 24 mm. Hg. On a zero to 100 scale representing 1 log cycle from 100 to 1,000 mm. Hg, 720 mm. Hg would be approximately 85. Thus the microdial 154 should be set to 85, causing the recorder pen 124 to be driven at the 85 chart position.

The depression of the calibrate button 158 also activates a clutch 194 which is mechanically linked to the recorder solenoid 138. The variable slide wire resistor 162 is clutch connected to the recorder slide wire spindle. Thus when the predetermined voltage from the 100 ohm micrometer 148 is impressed across the recorder input through the recorder input switch 136, the slide wire is positioned by the clutch 194 to provide a compensating voltage across the bridge arm 168 of the resistive bridge network 160.

During the initial standardization and calibration, this compensating voltage should be zero as the recorder value in the standard mode (where a standardized gas is introduced to the electrode) is the same as the recorder value in the calibrate mode (where the recorder reads a portion of the voltage across the 100 ohm micrometer 148). Thereafter, the compensating voltage is so adjusted that the exact potential is introduced into the meter output to retain the recorder pen 124 at the same position maintained when the predetermined voltage is impressed on the input of the recorder 122.

The depression of the measure button 196 causes the moveable contacts of calibrate switch 190 to return to normal position in contact with the lower immovable contact members of the calibrate switch 190. Thus the control valve solenoid 186 is no longer energized through the upper immovable contact member 190a of calibrate switch 190. As has been described the control valve 108 thus returns to its normal position allowing valves 52, 56 and 66 to close simultaneously and cause the introduction of the sample solution having a gas, the partial pressure of which is to be determined, into the electrode 18. The measure contact switch 198 is made when the measure button 196 is depressed thus activating measure light 200.

In the measure mode the meter and recorder sense the output of the electrode in response to the partial pressure of the gas in the sample solution. The recorder however follows this voltage with the compensating voltage produced by the bridge arm 168 of the resistive bridge network 160.

Description of automatic operation of the meter and recorder system

After equilibrium position has been reached in the standard mode the automatic button 202 may be depressed. Depression of the automatic button 202 causes the moveable contact members of the standard switch 180 to be depressed into their normal position on contact with lower immovable contact members of the switch 180. The depression of the automatic button 202 also causes the moveable contact members of the automatic switch 204 to move into contact with upper immovable contact members of the switch 204.

The depression of the automatic button 202 activates a time delay relay 206 capable of generating a wave for a predetermined time adjustable from zero to 30 seconds. This delayed timer may take the form of a solid state electronic switching device Guardian type TDO-62C30-115A. For example the delay timer may generate a square wave pulse for a duration equal to the predetermined time set on the delay timer relay 206. During this predetermined time the control valve solenoid 186 remains open for calibration and the power delivered by the time delay relay 206 activates the transformer 142 for switching the recorder input switch 136 to the lower immovable terminal 144, thus impressing the predetermined voltage from the 100 ohm micrometer 148 into the recorder input. An indication may thus be made of the calibration on the chart and the standardizing timer 208 may initiate its timing cycle.

The standardizing timer 208 may take the form of a fixed speed motor (not shown) drivingly connected to a disc 210. A switch lever 212 rides on the surface of the rotating disc 210 and causes the switch 214, normally in the mode position, to break contact when the switch lever rides into a depression 216 in the disc 210. Thus the contact of switch 214 is broken whenever the motor (not shown) drives the disc 210 through a full revolution.

At the termination of the predetermined time duration of the pulse generated by the time delay timer 206, the double pole double throw switch 218 of the time delay timer 206 is activated and the moving members of the switch 218 move out of normal position into contact with lower immovable members of the switch 218. This contact activates automatic relay solenoids 220 and 222 causing the double pole double throw relay switch 224 to be moved out of its normal position into contact with the lower immovable contact members of the switch 224 and causing double throw relay switch 226 to be moved out of normal position into contact with the lower immovable contact members of switch 226.

The switching relay switches 224 and 226 causes the deactivation of transformer 142 and thus a return of the recorder input switch 136 to its normal position in contact with the upper immovable terminal 146 of the recorder input switch 136 so that the input to the recorder 122 is the series combination of the voltage produced by the electrode 18 in series with the bridge voltage across the bridge arm 168 of the resistive bridge network 160.

The activation of relay switches 224 and 226 also energized the sample timer device 228. The sample timer may be a fixed slow speed motor timer of the type commonly known in the art. Associated with the sample timer 228 is a solenoid 230 which is energized by the expiration of one revolution of the sampler timer 228. The energized solenoid causes a timer switch 232 to be moved from its normal contact with the lower immovable terminal of the timer switch 232 into contact with the upper immovable terminal, thus interrupting power to solenoid 220 and allowing the return double pole double throw relay switch 224 to its normal position in contact with the upper immovable contacts of the switch 224.

The momentary opening of timer switch 232 stops the sample timer 228 and initiates operation of the standardizing timer 208 and energizes the control valve solenoid 186 which, as has been described before, causes the replacement of the sample solution in the electrode 18 by a standardized gas. The standardizing mode into which the monitor has been placed is terminated by the opening of the standardizing timer switch 214 as has been described. This action renews the calibration cycle by interrupting power to automatic relay 222 which allows the switch 226 to return to its normal position having moveable contact members in contact with the upper immovable contact members of the switch 226.

In its normal position, switch 226 energizes the time delay relay 206 while permitting the control valve solenoid 186 to remain open and the standardizing timer 208 to continue turning until the actuation of the time delay relay switch 218 of the time delay relay 206. Finally, the actuation of the time delay relay 206 energizes automatic relays 220 and 222 and deenergizes the control valve solenoid 186. The monitor is once again in the on-stream mode and may thus perform another complete cycle.

We claim:

1. A method of continuously determining the partial pressure of a gas in a liquid solution, comprising the steps of:
   maintaining a membrane, which is substantially permeable to the gas, in continuous contact with a flow of the liquid which contains the gas which is to be measured by continuously impinging a stream of the liquid on one side of said membrane,
   altering the pH of a buffer solution on the other side of said membrane as a function of the partial pressure of the gas by continuously diffusing at least some of the gas through the membrane between the liquid and the buffer solution,
   generating a signal which corresponds to the partial pressure of the gas by sensing the magnitude of the pH change in said buffer solution,
   ceasing said impinging flow of liquid,
   vaporizing a portion of the liquid by nebulizing the liquid with gas of a known partial pressure and of the same kind as said gas which is being measured,
   exposing said one side of said membrane to said vaporized liquid and nebulizing gas, and
   varying the pH of said buffer solution by diffusing the known partial pressure gas from the mixture through said membrane to calibrate the signal.

2. A method of continuously determining the partial pressure of carbon dioxide in a liquid solution, comprising the steps of:
   maintaining a membrane, which is substantially permeable to said carbon dioxide, in continuous contact with a flow of the liquid which contains said carbon dioxide which is to be measured by continuously impinging a stream of the liquid on one side of said membrane,
   altering the pH of a buffer solution on the other side of said membrane as a function of the partial pressure of said carbon dioxide by continuously diffusing at least some of said carbon dioxide through the membrane between the liquid and the buffer solution, and
   generating a signal which corresponds to the partial pressure of said carbon dioxide by sensing the magnitude of the pH change in said buffer solution.

3. The method of claim 2 including:
   maintaining the entire surface of said one side of said membrane in contact with a body of said liquid during the measurement of said carbon dioxide pressure, and
   directing said flow of impinging liquid into said body of liquid.

4. The method of claim 2 wherein the direction of flow of said impinging liquid is substantially normal to said one side of said membrane.

5. A method of continuously monitoring the partial pressure of carbon dioxide in an intravenous solution, comprising,
   continuously impinging a sample flow of said intravenous solution which contains the carbon dioxide to be measured against one side of a membrane,
   altering the pH of a bicarbonate solution on the other side of said membrane as a function of the partial pressure of the carbon dioxide in the sample flow by continuously diffusing at least some of the carbon dioxide through the membrane between the sample flow and the bicarbonate solution, and
   generating a signal which corresponds to the partial pressure of the carbon dioxide in said intravenous solution by sensing the magnitude of the pH change in said bicarbonate solution.

6. Apparatus for continuously measuring the partial pressure of a gas in a liquid solution comprising in combination:

a housing defining a sampling chamber therein, ion sensitive measuring electrode means, said electrode means including a portion containing a buffer solution therein the pH of which is altered by the presence of the gas which is to be measured, means for producing a signal corresponding to the pH of said buffer solution, a semipermeable membrane permeable to said gas separating said portion from said chamber, a reservoir for supplying said portion with said buffer solution, and means for introducing a gas under pressure, which is substantially identical in composition to that which is being measured, to said reservoir, impinger means for introducing the liquid containing the gas into the chamber, and discharge means for removing the liquid from the chamber, the flow of fluid from said impinger means being directed against the chamber side of said membrane and said discharge means being positioned relative to said chamber so as to maintain said chamber adjacent said membrane continuously and completely full of the liquid during measurement, whereby at least some of the gas in the liquid issuing from said impinger means diffuses through said membrane and alters the pH of said buffer solution by an amount which corresponds to the partial pressure of the gas.

7. Apparatus for continuously measuring the partial pressure of a gas in a liquid solution comprising in combination:

a housing defining a sampling chamber therein, ion sensitive measuring electrode, means, said electrode means including a portion containing a buffer solution therein the pH of which is altered by the presence of the gas which is to be measured, means for producing a signal corresponding to the pH of said buffer solution, and a semipermeable membrane permeable to said gas separating said portion from said chamber, impinger means for introducing the liquid containing the gas into the chamber, discharge means for removing the liquid from the chamber, the flow of fluid from said impinger means being directed against the chamber side of said membrane and said discharge means being positioned relative to said chamber so as to maintain said chamber adjacent said membrane continuously and completely full of the liquid during measurement, whereby at least some of the gas in the liquid issuing from said impinger means diffuses through said membrane and alters the pH of said buffer solution by an amount which corresponds to the partial pressure of the gas, drain means for draining said chamber, and calibrating means communicating with said chamber for calibrating said electrode, said calibrating means including inlet means for introducing a gas of the same kind as the gas which is to be measured and nebulizer means for mixing the gas introduced through said inlet means with a portion of the liquid to contact the chamber side of said membrane with a gaseous mixture of the gas and liquid.

8. The apparatus of claim 7 wherein said calibrating means includes a sump and said nebulizer means communicates with said sump to vaporize a portion of the liquid which remains in said sump when said chamber is drained.

9. The apparatus of claim 7 including bypass means for diverting the flow of liquid from said impinger means away from said chamber during calibration of said electrode.

10. The apparatus of claim 7 wherein said discharge means communicates with said calibration means so as to maintain both said chamber and said calibration means substantially full of liquid during the measurement.

11. Apparatus for continuously measuring the partial pressure of carbon dioxide in a liquid solution comprising in combination:

a housing defining a sampling chamber therein, ion sensitive measuring electrode means, said electrode means including a portion containing a buffer solution therein the pH of which is altered as a function of the partial pressure of the carbon dioxide which is to be measured, means for producing a signal corresponding to the partial pressure of said carbon dioxide in response to the pH of said buffer solution, and a semipermeable membrane permeable to said carbon dioxide separating said portion from said chamber, impinger means for introducing the liquid containing said carbon dioxide into the chamber, and discharge means for removing the liquid from the chamber, the flow of fluid from said impinger means being directed against the chamber side of said membrane and said discharge means being positioned relative to said chamber so as to maintain said chamber adjacent said membrane continuously and completely full of the liquid during measurement, whereby at least some of the carbon dioxide in the liquid issuing from said impinger means diffuses through said membrane and alters the pH of said buffer solution by an amount which corresponds to the partial pressure of the carbon dioxide.

12. The apparatus of claim 11 wherein said buffer solution is an aqueous bicarbonate solution.

13. The apparatus of claim 11 wherein said membrane is Teflon.

14. The apparatus of claim 1 wherein said ion sensitive measuring electrode means consists of a single pH electrode.

References Cited

UNITED STATES PATENTS

| | | | |
|---|---|---|---|
| 3,070,539 | 12/1962 | Arthur et al. | 204—195 P |
| 3,467,582 | 9/1969 | Petersen et al. | 23—230 Bio X |

FOREIGN PATENTS

| | | | |
|---|---|---|---|
| 726,863 | 2/1966 | Canada | 204—195 |

MORRIS O. WOLK, Primary Examiner

R. M. REESE, Assistant Examiner

U.S. Cl. X.R.

23—230 B, 253 R, 254 E; 73—64.3; 204—195 P